United States Patent [19]

Cunningham et al.

[11] 4,101,527

[45] Jul. 18, 1978

[54] MOISTURE CURING POLYMERS PREPARED FROM POLYFUNCTIONAL ISOCYANATES AND A DIOXAZABICYCLO OCTANE

[75] Inventors: Arthur L. Cunningham, Park Forest; John Mathai, Chicago, both of Ill.

[73] Assignee: The Sherwin-Williams Company, Cleveland, Ohio

[21] Appl. No.: 770,245

[22] Filed: Feb. 18, 1977

[51] Int. Cl.$^2$ .............................................. C08G 18/00
[52] U.S. Cl. ...................................... 528/73; 252/182; 260/859 R; 260/873; 260/874
[58] Field of Search ........ 260/75 TN, 77.5 R, 77.5 B, 260/859 R, 873, 874; 252/182

[56] References Cited

U.S. PATENT DOCUMENTS

| | | | |
|---|---|---|---|
| 3,644,345 | 2/1972 | Siegrist et al. | 260/77.5 R |
| 3,661,861 | 5/1972 | Hunsucker | 260/77.5 R |
| 3,676,397 | 7/1972 | Clarke | 260/77.5 R |
| 3,743,626 | 7/1973 | Emmons | 260/77.5 R |
| 3,793,236 | 2/1974 | Ashida et al. | 260/77.5 R |
| 3,817,938 | 7/1974 | Ashida et al. | 260/77.5 R |
| 3,937,716 | 2/1976 | Lewis et al. | 260/77.5 R |
| 3,946,014 | 3/1976 | Fuger et al. | 260/77.5 R |

*Primary Examiner*—M. J. Welsh
*Attorney, Agent, or Firm*—Richard G. Smith; James V. Tura; Neil A. DuChez

[57] ABSTRACT

Polymer forming reactions have been previously known comprising five and six member oxazoline ring oxazolidines and reaction products containing the basic structure with polyfunctional aromatic and aliphatic isocyanates and moisture. Five types of oxazolidines have been previously illustrated. Use of these polymeric products have been found to be limited as the class of oxazolidines described in the prior art result in objectionable dark colored products. This invention relates to an advance thereover in providing light colored end products by use of a novel and specific dioxazabicyclo octanes, a substituted specialized class of oxazolidine ring compounds.

10 Claims, No Drawings

MOISTURE CURING POLYMERS PREPARED FROM POLYFUNCTIONAL ISOCYANATES AND A DIOXAZABICYCLO OCTANE

In the manufacture and use of chemical decorative and protective coatings color is often of paramount importance. Often whites and light colors cannot be produced from polymeric materials which contain chromophoric groups. Thus, polymeric products having minimum opacifying structure are an objective in most polymer research and development. The prior art has suggested use of a rather broad class of oxazolidines identified by five and six member ring structure as useful in producing a variety of moisture setting polymeric coatings from this class of materials when in combination with polyfunctional isocyanates (See U.S. Pat. No. 3,743,626).

The class of products priorly disclosed have the disadvantage of poor thermal stability and hence objectionable color during oxazolidine pre-polymer preparation which limits their utility disproportionately.

It has been found that a class of oxazolines having a dioxazabicyclooctane structure may be made by reacting one mol of primary amine of the general structure:

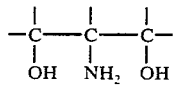

with two molecules of selected carbonyl compounds in which case the dioxazabicyclooctanes of this invention are formed [(Br. Pat. No. 564,506; J. Am. Chem. Society, 73, 2595 and 2596 (1951); 67, 1515 (1945); 72, 2657 (1950), U.S. Pat. No. 2,448,890 and U.S. Pat. No. 3,661,923], all of which are incorporated herein by reference.

Pre-polymers formed from compounds which are generically referred to herein as dioxazabicyclooctanes or compounds having one or more dioxazabicyclooctane residues can be pre-mixed with polyfunctional isocyanates to form products having operable package stability (as compared with polyfunctional amines or hydroxy monomers or pre-polymers) with time in a closed container free from moisture. They may be applied in their coatings, sometimes referred to herein as chemical coatings, which will thereafter take on sufficient moisture from the ambient air to form tough and chemically resistant coatings useful on a wide variety of substrates for protective and decorative coatings end uses. Moisture from the ambient air is sufficient to enhance the curing rate so that strongly crosslinked films result. Entrained moisture will destroy pot life. Additionally, the above composition may be further extended with acrylic esters (methyl or ethyl acrylates and methacrylates) (20 to 60%) which may contain 0–50% of hydroxy alkyl acrylates and 100 to 50% thereof of unsaturated monomers polymerizable therewith by addition polymerization in the presence of free radical catalysts or initiators, e.g. tertiary butyl perbenzoate.

The useful dioxazabicyclooctanes of this invention are characterized by the following generic structure:

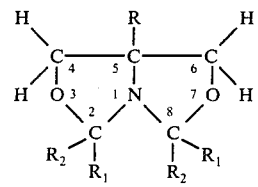

$R$ is hydrogen, alkyl or alkylol and
where $R_1$ and $R_2$ are hydrogen, aliphatic or aromatic groups, illustratively phenyl and aliphatic substituents illustratively $C_1$-$C_{12}$ alkyl groups depending upon the reactant compounds selected as precursors therefor. Known precursors include among the carbonyl groups; formaldehyde, acetaldehyde, butryaldehyde, heptaldehyde, propionaldehyde, hexanol, benzaldehyde, 2-ethyl hexanol and phenyl acetaldehyde and among the amino alcohols 2-amino 1,3 propane diol; 2-amino-2-methyl-1,3-propane diol, trimethylol melamine; 2-amino-2-ethyl 1,3-propane diol, 2-amino-2-methylol-1,3-propane diol (tris(hydroxy methyl)amino methane, etc. and isomers and homologues thereof, all illustrated and encompassed by the general structure:

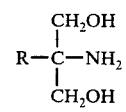

where R is a member of the group consisting of hydrogen, alkyl, and alkyol radicals.

In a specific embodiment used as illustrative herein, a preferred dioxazabicyclooctane is produced by condensing 2-amino-2-hydroxymethyl-1,3-propane diol in xylene with paraformaldehyde (see Example I) to produce 5-(2-hydroxyethyl)-1-aza 3,7-dioxabicyclo-(3,3,0)-octane.

Additionally useful compounds for the purpose of this invention are produced from the parent dioxabicyclooctane by transesterification with, for example, dimethyl esters of a variety of organic acids including dimethyl glutarate, dimethyl phthalate, dimethyl-1,4-cyclohexane dicarboxylate, dimethyl terephthalate; 2,2,4-trimethyl-1,3-pentane diol, methyl methacrylate and other hydroxy functional monomers including propylene glycol, hydroxy ethyl acylate, hydroxy propyl acrylate, etc. The essential reactant group, however, is the dioxazabicyclooctane which is reactive with polyfunctional isocyanates in the presence of moisture.

Suitable known catalysts in from about 0.1 to 5% range (not quantitatively critical) can be employed to aid transesterification including as illustrative base metal hydroxides and alkoxide in methanol solutions, alkali metal salts of phenol, tetraalkyl titanates, tin oxide, etc. Completion of the reaction can be followed by measuring the alcohol removed. Vinyl unsaturation in the transesterification products give rise to reactive sites for addition polymerization to occur to form linear polymeric chains, etc.

The general bicyclooctanes as illustrated above as well as those transesterification products thereof are characterized by presence of the preferred active group in the structure as follows:

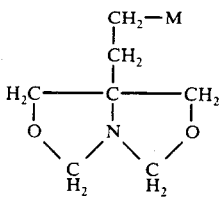

where M is hydroxyl group.

Polyfunctional isocyanates and oligomers containing plural number of isocyanate groups useful as coreactants with the foregoing dioxazabicyclooctane groups either alone or as residues of transesterification reaction products, have been disclosed generally. We have elected to use a standardly available polyisocyanate for illustrative purposes having the structure:

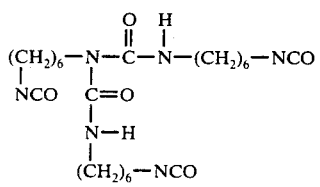

This polyisocyanate is commonly identified by the tradename "Desmodur N" (a product of Mobay Chemical Company). Another useful polyfunctional isocyanate commercially available is identified as T-1890 of Verba Chemie whish is generally recognized as an isophorone diisocyanate (isocyanurate) oligomer.

Aliphatic polyisocyanates include, but are not limited to alkylene diisocyanates illustratively; 1,6-hexamethylene diisocyanate 1,8 octamethylene diisocyanate, etc.; and unsaturated aliphatic species, for example, transvinylene diisocyanate.

Aromatic polyisocyanates, illustratively; toluene diisocyanate and naphthalene diisocyanates and prepolymers of polyisocyanates with polyhydroxy or polyamino compounds such as any of the above with polyether polyols, polyester polyols, etc., all as are known in the art are useful. Useful techniques for preparation of isocyanate prepolymers are found in Sanders and Frisch, Polyurethanes: Chemistry and Technology, Part II Interscience, N.Y., 1964 and references therein.

Pot life of the compositions herein are stable in the complete absence of moisture. However, reaction is initiated by trace amounts of moisture (most often a contaiminant of the raw materials used in coatings) which appears to initiate rapid hydrolysis of the bicyclooxazolidine ring. Hydrolysis gives rise to a plurality of active hydrogen sites, both amino and hydroxyl in nature. Thus, formulation with components, such as the usual pigments, volatile solvents, etc., which are common to protective and decorative coatings manufacture carry in traces of moisture which interfere with inherent stability. The bicyclic nature of the dioxazabicyclooctanes provides, minimally, a functionality of three with high likelihood of additional reactive sites leading to extensive crosslinking in the final polymer formed.

Additionally, one may form an end blocked polyurethane with the alcohol group with certain of the species of the dioxazabicyclooctanes of this invention (note the product of Example 1 as illustrative).

It is suggested that upon incorporation of moisture in the inventive combination of the dioxazabicyclooctanes, or transesterification products containing these reactive sites the plural oxazolidine rings are rapidly hydrolyzed, as above indicated to provide a plurality of highly active hydrogen sites. Thus, the pot life of the disclosed admixtures is directly related to the anhydrous nature of the raw materials incorporated in the finished coating compositions. Ratios of the polyfunctional isocyanate or prepolymers to the dioxazabicyclooctanes and their transesterification products is not extremely critical because of the relatively high reactivity. Crosslinked polymeric end products are obtained between about 1:5 to about 3:1 molar ratio of isocyanate to bicyclooctane. Solvents may be used in the compositions (essentially anhydrous, active hydrogen-free and volatile under ordinary room conditions of temperature and pressure). Pigments and fillers can be incorporated (substantially moisture-free) to control gloss, color, viscosity, working qualities, etc., as is well understood in the coating art. It is preferred to use two package systems and to combine the dioxazabicyclicoctane portion with the polyfunctional isocyanate within a reasonable period before use.

The following examples illustrate the best most presently known to practice the invention. All parts are by weight unless otherwise indicated.

EXAMPLE I

Preparation of 5-(2-hydroxyethyl)-1-aza-3,7-dioxabicyclo-(3,3,0)-octane

Into an electrically heated 5 liter distilling flask equipped with an agitator, thermometer, inert blanket, condenser and trap to collect distillate and vacuum were added 3146 parts (26.6 mol) 2-amino-2-hydroxymethyl-1,3-propanediol and 600 parts of xylene. The blend was heated to 200° F to form a liquid melt whereupon para-formaldehyde is added in two increments of 1000 parts and 600 parts by weight (53.3 mol). The contents of the flask are reacted at 212° F and all water formed by the reaction is removed and collected. After 2 hours, 500 parts of water were removed. The remaining solvent is additionally removed under vacuum. The resultant product referred to hereafter as "alcohol A" melted at about 150° F and the melt had a Gardner color of 1. The oxazoline product is identifiable as 5-(2-hydroxyethyl)-1-aza-3,7-dioxabicyclo-(3,3,0)-octane.

EXAMPLE II

Preparation of N-hydroxyethyl Oxazoline

Into an electrically heated distilling flask equipped with an agitator, thermometer, inert blanket, condenser, trap to collect distillate and vacuum were added 2630 parts (25.5 mol) of diethanol amine, 800 (26.6 mol) parts of para-formaldehyde and 250 parts toluene whereupon the mixture was allowed to react five hours during which time 350 parts of water was collected. Although the reaction was run under slight vacuum, most of the solvent was retained in the product to limit oxidation. The product referred to hereinafter as "Alcohol B" was a black liquid having a Gardner color of 18. This is representative of prior art five and six member oxazoline ring compounds. Subsequent preps in which great care was taken to limit the time at reaction temperature and exposure to oxygen also yielded very dark products, Gardner Color 12-13 at 45.7% concentration; Gardner Color 11-12 at 85.9%, Gardner Color of 10-11 at 95% solids.

The foregoing examples demonstrate the superior color stability of the bicyclooxazoline (Alcohol A) prepared in Example I to the 3-(2-hydroxyethyl)-1,3-oxazoline (Alcohol B) of Example II found in the prior art.

EXAMPLE III

Preparation of bis(2-(1,3-oxazolidin-3-yl)ethyl) Phthalate

Into an electrically heated five liter distilling flask equipped with inert nitrogen blanket, agitator, thermometer, condenser, distillate trap and vacuum was added; 2363 parts (23 mol) diethanol amine, 690 parts (23 mol) para-formaldehyde and 1000 g. (5.15 mol) dimethyl phthalate. Water was removed for two hours, 800 parts (4.12 mol) additional dimethyl phthalate was added and the reaction was continued until (theoretical) 23 mols of water was removed. 50 parts of tetraisopropyl titanate was then added and the reaction was continued at 285° F until approximately 18.6 mol of methanol was removed. The product was a tar-like semi-solid which was objectionably dark in color for use in decorative coatings.

EXAMPLE IV

Bis(5-(1-aza-3,7-dioxabicyclo-(3,3,0)octanyl)-ethyl)-Glutarate

To a five liter electrically heated flask equipped with inert blanket, agitation, thermometer, condenser, distillate trap and vacuum was charged 1871 parts (12.9 mol) of "alcohol A" (see Example I), 1040 parts (6.5 mol) of dimethyl glutarate and 3 parts of dibutyl tin oxide. This mixture was transesterified at reduced pressure at 250° F until 402 parts (12.6 mol) methanol was removed. The product had a Gardner color of 11 and a Gardner-Holdt viscosity of $A_1$. The color thereof was practically useful in decorative topcoats.

EXAMPLE V

Bis(5-(1-aza-3,7-dioxabicyclo-(3,3,0)-octanyl)ethyl)-Phthalate

Example IV was repeated in every respect except 1261 parts (6.5 mol) of dimethyl phthalate was used in place of dimethyl glutarate. The product is a semisolid of acceptable color.

The products of Examples IV and V were blended with the tri(hexamethylene) isocyanate (Desmodur N) in a ratio of NCO: bicyclooctane in ratios of 1:1 to 2:1 and remained fluid (in the absence of air (moisture) for several weeks. Solution in volatile solvents coated in films dried tack-free in 24 hours. These provided excellent topcoats for metal finishing at 1½ mils film build.

EXAMPLE VI

Bis(2-(1,3-oxazolidin-3,61)ethyl)-Glutarate

Example IV is repeated in every respect, except that 1483 parts (12.9 mol) of "Alcohol B" of Example II was used. A mobile liquid too highly colored for use in decorative films resulted.

EXAMPLE VII (a) 1600 parts (53 mol) para-formaldehyde, 3146 parts (26 mol) 2-amino-2-hydroxymethyl-1,3-propanediol and 600 parts of toluene were charged into an electrically heated distilling flask and 950 gm. (26 mol) of water was removed by reaction at 200° F under partial vacuum.

(b) 2195 parts (15 mol) of the product from step (a) was blended with 2080 parts (13 mol of dimethyl glutarate and 243 parts of toluene was removed under vacuum. 3.5 parts of dibutyl tin oxide was added and 421 parts (13.2 mol) of methanol was removed at 350° F under partial vacuum to form a bicyclic oxazolidine glutarate monoester, referred to hereafter as "glutarate monoester C".

(c) To 2000 parts (7.3 mol) of "monoglutarate ester C" was added at 270° F, 1040 parts (8 mol) hydroxy propyl acrylate, 960 parts of isobornyl methacrylate and 35 parts of tert-butyl perbenzoate. A second charge of 5 parts tert-butyl perbenzoate was added and the reaction was held to complete the free radical reaction. An additional part of dibutyl tin oxide was added, and methanol was collected while holding the reactants at 288° F under vacuum. 440 parts toluene was added to reduce the pre-polymer content to 90% by weight. The resultant pre-polymer had a Gardner color of 11-12, Gardner viscosity of 50 poise. Topcoats produced therefrom moisture set in less than 24 hours. See Table I for further detail on use and performance.

EXAMPLE VIII 2000 parts (7.3 mol) of "glutarate monoester C" was charged into a five liter electrically heated, distilling flask equipped with agitator, thermometer, vacuum, condenser and distillate trap. 520 parts (4 mol) hydroxy propyl acrylate, 1480 parts of isobornyl methacrylate and 35 parts of t-butyl perbenzoate were added dropwise over about 3 hours while the reactants were held at a temperature of 270° C. Five additional parts of t-butyl perbenzoate were then added, and the reactants were held an additional 2 hours at 270° C to obtain a near quantitative conversion in the free radical polymerization. Vacuum was maintained during the final 2 hours and approximately 2 mol methanol was removed. There resulted an acrylic prepolymer containing a dioxazabicyclooctane nucleus having the generic structure:

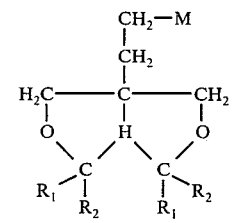

where $R_1$ and $R_2$ are hydrogen, aliphatic or aromatic groups depending on reactant precursor compounds as indicated above and where M is hydroxyl group linking the structure as shown to low molecular weight esters and through the ester linkages to the polyacrylate structures indicated through transesterification procedures which attach many "gluterate monoester C" acid ester residues onto hydroxyl functional groups of the polyacrylate.

The prepolymer had a viscosity of about 700 poise at 100% solids and a Gardner Color of 10-11.

Examples VII and VIII prepolymers were formulated into white enamels in accordance with Table I which follows:

TABLE I

| White Enamel Formulation | VII-A | VII-A |
|---|---|---|
| Prepolymer (from Identified Examples) | 283 | — |
| Prepolymer (from Identified Examples) | — | 255 |
| Rutile Titanium Dioxide | 350 | 350 |
| Ethoxyethyl Acetate | 57 | 85 |

The above base was ground to an enamel grade with a high speed pigment disperser. The base was then let down (thinned down) as follows:

| Prepolymer from above | 330 | — |
|---|---|---|
| Prepolymer from above | — | 298 |
| Ethoxyethyl Acetate | 60 | 92 |
| Methyl Ethyl Ketone | 42 | 42 |
| Silicone | 6 | 6 |
| Viscosity (Zahn #3) sec. | 31 | 17 |

The thin-down of above was further compounded with Polyurethane (Desmodur N) in a weight ratio of 3 of urethane to 2 of the above base paints. Film thicknesses of the order of 1½ mils.

| Bake 30 min. at 250° F | Tack free | Tack free |
|---|---|---|
| Air Dry: | | |
| Set | 2hrs. | 2hrs. |
| Tack-free | 2hrs. | 2hrs. |
| Pot Life (Liquid) | 10min. | 30min. |
| Reverse Impact (inch pounds) | 160 | 160 |
| ⅛ inch Mandrel bend test | No cracks | No cracks |
| Pencil Hardness - Initial Bake | F | 2H |
| Bake - 2 weeks | 3H | 3H |
| Air dry - 2 weeks | 2H | F |
| Gloss Retention | Excellent | Excellent |

EXAMPLES IX-XIV

A series of dioxabicyclooctane (oxazolidinyl) polyesters were produced as in Example IV. All ratios shown are molar.

TABLE II (A series of Examples of bicyclic octane polyesters were compounded by procedures as illustrated in Example IV wherein all ratios as shown are molar as tabulated below: They are identified by the Example number at the top of the column.)

| Identification Numbers: | IX | X | XI | XII | XIII | XIV |
|---|---|---|---|---|---|---|
| Components: | | | | | | |
| Alcohol "A" (Example I) | 2.0 | 2.0 | 2.0 | 2.0 | 2.0 | 2.0 |
| Dimethyl Glutarate | 2.5 | — | — | — | 2.75 | 40 |
| Dimethyl Phthalate | — | 2.5 | — | — | — | — |
| Dimethyl-1,4 Cyclohexane Dicarboxylate | — | — | 2.5 | — | — | — |
| | | | 2.5 | | | |
| Dimethyl Terephthalate | — | — | — | 2.5 | — | — |
| Propylene Glycol | — | — | — | — | 1.5 | — |
| 2,2,4-Trimethyl-1,3-Pentanediol | 1.5 | 1.5 | 1.5 | 1.5 | — | 3.0 |
| Trimethylol Propane | — | — | — | — | 0.17 | — |

The above compositions were further blended in a 1:1 weight ratio of a polyisocyanate, as hereinbefore described, which when applied in thin films dried tack-free at room temperature or force dried at low temperatures (150° F).

Similar blends and tests were made using copolymer modified dioxazobicyclo octane esters illustratively shown in Examples VII and VIII by using hydroxyethyl acrylate, hydroxy propyl acrylate, butyl acrylate, methyl methacrylate and styrene and various low molecular weight esters similar to "glutarate monoester C", but formulated with various other dicarboxylic diesters. Desmodur N was used as the isocyanate. Ratio of isocyanate to prepolymer resin was of the order of 2:3. The films dried tack-free in 4 hours or less.

The term dioxazabicyclo octane as used and illustrated herein in the specification, examples and claims and as structurally set out on page 3, paragraph two is based on known prior art chemical nomenclature (as will be found in U.S. Pat. No. 2,448,890 included herein by reference and an article by E. P. Bergmann Chemical Reviews Vol. 53, 1953, page 315) and the generic term dioxazabicyclo octane is herein defined and limited to compounds within the specific structure of page 3, paragraph two herein only.

Having described the invention, we claim:

1. A composition polymerizable to a cured film in the presence of moisture which comprises a polyfunctional isocyanate and a dioxazabicyclooctane.

2. The composition of claim 1, wherein the dioxazabicyclooctane has the generic structure:

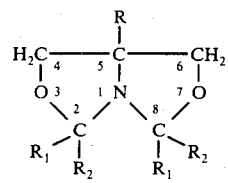

where R is a hydrogen, alkyl or alkyol and where $R_1$ and $R_2$ are hydrogen, aliphatic or aromatic groups.

3. The composition of claim 2 wherein the polyfunctional isocyanate component therein has at least two and not more than three isocyanate groups in the molecule.

4. The composition of claim 3 wherein the polyfunctional isocyanate has the structure:

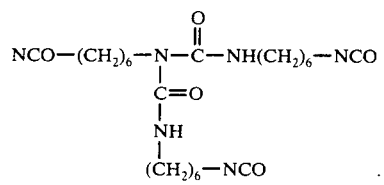

5. The composition of claim 1 wherein the dioxazabicyclooctane is 5-(2-hydroxyethyl)-1-aza-3,7-dioxabicyclo-(3,3,0)-octane.

6. A composition which comprises a polyester having one or more reactive dioxazobicyclooctane groups and a polyfunctional isocyanate characterized by its reactivity in the presence of moisture to form a solid polymeric, crosslinked structure.

7. The composition of claim 6 wherein the polyester is the transesterification product of a dimethyl ester of an unsaturated dicarboxylic acid, a polyol and a dioxazobicyclooctane of the aliphatic or aromatic structure:

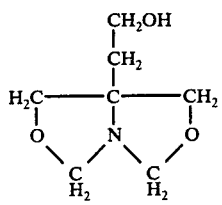

8. The composition of claim 7 containing in addition thereto 20 to 60% of an acrylic ester containing from 0 to 50% of said acrylic ester of a hydroxy alkyl acrylate and 100 to 50% of said acrylic ester of an unsaturated monomer polymerizable therewith by free radical catalyst initiators.

9. The composition of claim 8 where the acrylic ester is a blend where the hydroxy alkyl acrylate is hydroxy propyl acrylate and the acrylic ester is isobornyl methacrylate.

10. The composition of claim 1, wherein the dioxazabicyclo octane has the structure:

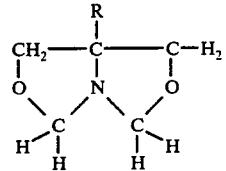

where R is an alkylol group.

* * * * *